(12) United States Patent
Herschbach et al.

(10) Patent No.: US 6,359,074 B1
(45) Date of Patent: Mar. 19, 2002

(54) HIGH STRENGTH PLASTIC FILM AND PROCESS FOR ITS PRODUCTION

(75) Inventors: Christof Herschbach, Munster; Juergen Linkies, Lienen; Markus Stumpf, Munster, all of (DE)

(73) Assignee: Windmöller & Hölscher, Lengerich (DE)

( * ) Notice: Subject to any disclaimer, the term of this patent is extended or adjusted under 35 U.S.C. 154(b) by 0 days.

(21) Appl. No.: 09/578,032

(22) Filed: May 25, 2000

(30) Foreign Application Priority Data

May 25, 1999 (DE) .......................................... 199 23 971

(51) Int. Cl.[7] .............................. C08F 8/00; C08L 33/00; C08L 33/04; C08L 33/06; C08L 35/02

(52) U.S. Cl. ........................ 525/240; 525/221; 525/222; 525/227; 525/229; 525/240

(58) Field of Search .................................. 525/191, 221, 525/222, 227, 229, 240

(56) References Cited

U.S. PATENT DOCUMENTS

| | | | | |
|---|---|---|---|---|
| 3,975,463 A | * | 8/1976 | Hirata et al. | 525/191 |
| 4,537,935 A | * | 8/1985 | Yoshimura et al. | 525/222 |
| 4,814,124 A | * | 3/1989 | Aoyama et al. | 264/41 |
| 4,945,127 A | * | 7/1990 | Kagawa et al. | 524/524 |

* cited by examiner

*Primary Examiner*—Nathan M. Nutter
(74) *Attorney, Agent, or Firm*—Jacobson Holman, PLLC

(57) ABSTRACT

A high strength, stretched, polyethylene plastic film is described. To obtain better stretchability, the film includes an effective amount of an acetate polymer. Typically, the polyethylene film contains up to 10% of acetate polymer. A suitable acetate polymer is polyvinyl acetate. A process for the production of a high strength polyethylene plastic film including an acetate polymer is also described.

7 Claims, No Drawings

HIGH STRENGTH PLASTIC FILM AND PROCESS FOR ITS PRODUCTION

The invention relates to a plastic film comprising mainly of polyethylene, which has been stretched in order to increase its strength, and which also contains an acetate polymer, such as vinyl acetate. A process for the production of such a plastic film is also described.

Polyethylene is commonly used in the production of plastic films. The film is usually produced from polyethylene granules by the blown film extrusion process. It is already known that the weldability of this blown polyethylene film can be improved by admixing a suitable amount of acetate granules to the polyethylene granules in the film blowing process. The resulting films are easy to weld, in comparison to a blown polyethylene film.

Polyethylene films produced by the film blowing process exhibit to some degree inadequate strength. To improve the strength of such films, they are stretched. Such stretched films have, of course, the drawback that they can no longer be welded, even if additives that promote the weldability, such as acetate granules, are added to the film. For this reason no additives, for example no acetate granules, up to the present invention, have been included in the film when high strength plastic films are stretched in an additional working step after or during the blown film extrusion process. The strength of the plastic film is a function of how much the film can be stretched. Of course, there are natural limits to the stretchability of polyethylene films.

This invention seeks to provide a film based on polyethylene that exhibits maximum strength.

This invention provides a polyethylene film which is stretched in order to increase its strength, and which includes an effective amount of an acetate polymer.

Preferably, the polyethylene film includes up 10% by weight of acetate polymer. More preferably, the polyethylene film contains from about 2% to about 5% by weight of acetate polymers.

It was found surprisingly that plastic films made of polyethylene, to which an effective amount of acetate polymer is added, exhibit an improved stretchability. The invention is based on the knowledge that the addition of acetate polymer significantly reduces the formation of crystalline structures in the polyethylene film, so that the polyethylene film has an amorphous structure. The resulting films are easier to stretch during processing. When the films of this invention are stretched, it is found that the limit of stretchability of the film is improved to the point that it is possible to obtain plastic films having higher strength.

The distinction between these films and conventional plastic films to which acetate is added lies in the fact that they are substantially unweldable after stretching. In accordance with the invention, the addition of acetate granules has nothing to do at all with the improvement of the welding properties of the film, but rather only with the improvement of the stretchability of the film. The fact that the incorporation of an acetate polymer, typically vinyl acetate, could be used to improve film stretchability, and thus film strength, was unknown prior to this invention.

In accordance with the preferred embodiments, the polyethylene film contains up to 10% by wt. acetate polymer, preferably 2–5% by wt. acetate polymer.

A preferred process for producing a high strength plastic film includes the following steps:

(a) mixing polyethylene granules with acetate polymer granules, in the desired ratio;

(b) producing a film from the mixed granules using the blown film extrusion process; and.

(c) stretching the resulting film.

It can thus be seen that the improved films of this invention are produced by more or less conventional blown film preparation techniques.

Other details and advantages are explained in detail in the following embodiment.

Polymer granules, which comprise a mixture of 75% by weight polyethylene and 25% by weight polyvinyl acetate, are added to polyethylene granules, in a ratio so that the polyvinyl acetate comprises 10% by wt. of the final mixture of granules. The granules to be processed by the extruder comprise 75% by wt. polyethylene granules and 25% by wt. mixed polythene/polyvinyl acetate granules. The addition of polyvinyl acetate to the polyethylene yields a polymer film having a stretch ratio of 1:5 Without the addition of the polyvinyl acetate, the result would be a stretch ratio of only 1:2.

What is claimed is:

1. A polyethylene plastic film, which is stretched in order to increase its strength, and which contains vinyl acetate in an amount sufficient to increase its stretch ratio.

2. The plastic film according to claim 1, containing up to 10% by wt. vinyl acetate.

3. The plastic film according to claim 1, containing from 2% to 5% by wt. vinyl acetate.

4. A process for the production of a high strength polyethylene film according to claim 1, comprising:

(a) mixing polyethylene granules with acetate polymer granules having vinyl acetate, in the desired ratio provide a granules mixture;

(b) producing a film from the mixed granules using the blown film extrusion process; and (c) stretching the resulting film.

5. The process as claimed in claim 4, wherein the granules mixture contains up to 10% by wt. vinyl acetate.

6. A process as claimed in claim 4, wherein the granules mixture contains form 2% to 5% by wt. vinyl acetate.

7. A process as claimed in claim 4, including the further step of mixing polyvinyl acetate with polyethylene to provide a granular premix containing about 25% polyvinyl acetate, which is used as the acetate polymer granules in step (a).

* * * * *